United States Patent [19]
Schwarz et al.

[11] Patent Number: 6,044,454
[45] Date of Patent: Mar. 28, 2000

[54] IEEE COMPLIANT FLOATING POINT UNIT

[75] Inventors: Eric Mark Schwarz, Gardiner; Christopher A. Krygowski, Hopewell Junction; Timothy John Slegel, Staatsburg; David Frazelle McManigal, Red Hook; Mark Steven Farrell, Pleasant Valley, all of N.Y.

[73] Assignee: International Business Machines Corporation, Armonk, N.Y.

[21] Appl. No.: 09/026,328

[22] Filed: Feb. 19, 1998

[51] Int. Cl.[7] .............................. G06F 9/302; G06F 9/38
[52] U.S. Cl. ......................... 712/201; 712/244; 712/227; 712/222; 395/500.47
[58] Field of Search ..................................... 712/217, 218, 712/238, 240, 222, 216, 23, 206, 212, 215, 227, 244, 258, 245, 201, 149, 3; 711/3, 149; 710/131; 395/591, 595, 500.46, 500.47

[56] References Cited

U.S. PATENT DOCUMENTS

| | | | |
|---|---|---|---|
| 5,438,670 | 8/1995 | Baror et al. | 711/169 |
| 5,799,179 | 8/1998 | Ebcioglu et al. | 712/234 |

OTHER PUBLICATIONS

"When Floating–Point Addition Isn't Commutative" by F. Ris et al., Jan. 27, 1993, IBM Federal System Co., Boulder, Co, pp. 8–13.

"On the Design of IEEE Compliant Floating Point Units" by G. Even and W. Paul, 1997 IEEE 1063–6889/97, pp. 54–63.

"What Causes A Trap In IEEE–754 Floating Point?" by Fred Tydeman, IBM Corporation, Austin, TX, pp. 2–5.

"Implementation of Binary Floating Point Architecture to Enable Efficient Emulation of Single and Double Precision Arithmetic" IBM Technical Disclosure Bulletin, by Rodriquez, vol. 31, No. 3,Aug. 1988, p4–9.

"Floating Point Exception Handling (Denormalization)" IBM Technical Disclosure Bulletin, by Goldberg et al., vol. 33, No. 9, Feb. 1991, p345–348.

"Floating–Point Vector Microcode Exception Emulation" IBM Technical Disclosure Bulletin, by Vanover et al., vol. 34, No. 7B, Dec. 1991, p466–468.

"Round–Up Anticipator for IEEE Floating Point Standard–754" IBM Technical Disclosure Bulletin, by Atkins, vol. 36, No. 10, Oct. 1993, p141–144.

*Primary Examiner*—Daniel H. Pan
*Attorney, Agent, or Firm*—Lynn L. Augspurger

[57] ABSTRACT

IEEE compliant floating point unit mechanism allows variability in the execution of floating point operations according to the IEEE 754 standard and allowing variability of the standard to co-exist in hardware or in the combination of hardware and millicode. The FPU has a detector of special conditions which dynamically detects an event that the hardware execution of an IEEE compliant Binary Floating Point instruction will require millicode emulation. The complete set of events which millicode may emulate are predetermined early in the design process of the hardware. An exception handling unit assist millicode emulation by trapping the result of an exceptional condition without invoking the trap handler. When an exceptional condition is detected during execution, the IEEE 754 standard requires two different actions under control of a mask bit. If the mask bit is on, the result is written into an FPR and the trap handler is invoked. Otherwise, a default value is written, a flag is set, and the program continues execution. This allows a variation to the IEEE 754 standard. Two different versions of the function of the Multiply-then-Substract instruction are implemented for two different IEEE 754 compliant architectures.

20 Claims, 1 Drawing Sheet

IEEE COMPLIANT FLOATING POINT UNIT

FIELD OF THE INVENTION

This invention is related to computers and computer systems and the floating point unit thereof and in particular to the execution of floating point operations according to the IEEE 754 standard and allowing variability of the standard to co-exist in hardware or in the combination of hardware and millicode.

BACKGROUND OF THE INVENTION

The "IEEE Standard for Binary Floating-Point Arithmetic" (IEEE 754 Standard) is very complex especially in the definition of trapped results on exception conditions. The IEEE 754 standard does not dictate a single implementation. For instance underflow is defined in four different ways depending on two definitions of tininess and two definitions of inexactness. Microprocessor development has been hindered by the need to first complete an architecture that supports the IEEE 754 Standard before working on the microprocessor which supports the architecture.

SUMMARY OF THE INVENTION

Our invention provides three distinct mechanisms to allow variability in the execution of IEEE 754 Standard compliant Binary Floating Point computation. The first two mechanisms allow the execution of IEEE compliant Binary Floating Point instructions to vary dynamically. The third mechanism varies the execution of a specific instruction statically.

An ability to allow variability of execution of the architecture has allowed the development time of the microprocessor to be reduced in many ways. Since implementation errors in the hardware may not be found until late in the verification process, a mechanism for detecting these implementation errors and invoking millicode emulation may be a suitable final fix. This fix does not necessitate a hardware re-manufacture. Performance is not degraded significantly if the hardware only invokes emulation on rare events that hardware implements incorrectly.

The development time of the microprocessor is also reduced by allowing parallel development of the architecture and the microprocessor. If the microprocessor has the ability to change the function without changing hardware then the development of the architecture no longer has to serially gate the development of the microprocessor.

These and other improvements are set forth in the following detailed description. For a better understanding of the invention with advantages and features, refer to the description and to the drawings.

DETAILED DESCRIPTION OF THE INVENTION

Figure 1:
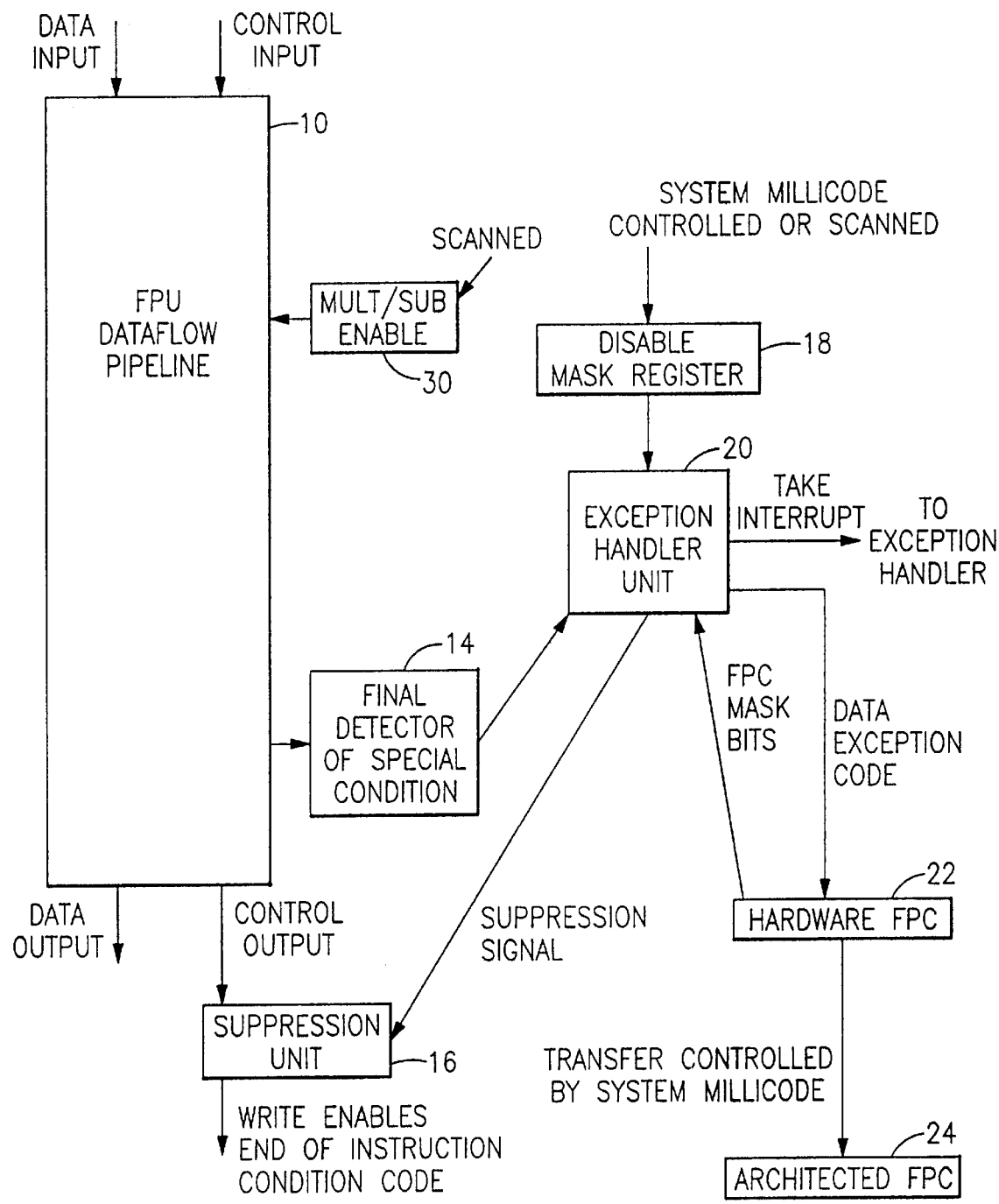
FIG. 1 shows schematically an overview of the preferred embodiment and particularly shows an exception handler units interaction with the floating point unit dataflow pipeline.

Turning now to our invention in greater detail, it will be seen from FIG. 1 which illustrates our preferred embodiment in which the a floating point unit FPU which in our preferred embodiment we provide has a control input and data input register, and a control and data write stage register from which the result of an instruction execution is transferred from the floating point unit to a storage unit via a data output. The floating point unit typically has multiple pipeline stages for arithmetic computation, a normalization stage, and a rounding stage, each of which pipeline stages may during processing of a stream of instructions contain a separate instruction. The stages are connected in an ordered manner such that the processing of instructions occurs in the dataflow pipeline 10 which receives the data and control input and performs a floating point computation. Resultant data are outputted from the pipeline along with controls. The control output will be used to update architectural information such as floating point array write enables and addresses, condition codes, and a completion signal which will advance the program pointer.

Now, in order to allow flexibility in development we have provided a first mechanism which dynamically detects an event that the hardware execution of an IEEE compliant Binary Floating Point instruction will require millicode emulation. The events occur during execution of the instruction in the floating point unit. The complete set of events which millicode may emulate are predetermined early in the design process of the hardware. Millicode as those familiar with this art know is implemented in IBM's line of CISC processors for the S/390 CMOS line of processors and is highly privileged subroutines in S/390 like code which the machines run while in millimode. With our invention the floating point mechanism is controlled by system registers which can be set by millicode or set at initial program load. When one of the events is detected, the corresponding system register mask is checked to determine if the operation should be completed or suppressed. In the case of suppression, the floating point suppresses all updates to any architected facilities and produces a pseudo-exception code. This pseudo-exception code is then passed to the trap handler by writting it into a hardware register called the hardware floating point control word (FPC). Note that the IEEE standard defines a trap handler which some architectures refer to as an exception handler, these terms are equivalent in this description. The trap handler is invoked by the take interrupt signal which causes a branch to a system memory area which contains the millicode routine referred to as the trap handler or exception handler. The trap handler reads the hardware FPC, interprets the pseudo-exception code, and then invokes the millicode routine which emulates the instruction using discrete instructions.

In accordance with our preferred embodiment then, a Suppression Unit 16 is used to gate the control output of the FPU dataflow pipeline 10 under control of a suppression signal. The suppression signal is supplied from the Exception Handler Unit 20. When the suppression signal is active, the FPU dataflow pipeline 10 is unable to update any architected facilities.

The detection of special conditions is performed in the Detector of Special Conditions Unit 14. This unit is responsible for detecting the five exceptional conditions as identified by the architecture such as invalid operation, divide by zero, exponent overflow, exponent underflow, and inexact result. This unit also detects other special predefined events. The first event is when any three operand instruction is executed which has one or more NaN operands. The second event is when a binary extended multiply, divide, or square root instruction with a denormalized input operand is executed. The third event is when any binary floating point instruction is executed that results in exponent overflow. The fourth event is when any binary floating point instruction is executed that results in exponent underflow. These events were predetermined to be complex to implement in hardware, prone to error, or to be an area in the architecture which is unstable. The occurrence of the exceptional conditions and special events is communicated to the Exception Handler Unit 20.

The Disable Mask Register 18 contains disable bits that will control the actions that occur when special events are detected by the Final Detector of Special Conditions Unit 14. The Disable Mask Register 18 contains four bits that correspond one for one to the four special events described above. This register can be updated by system millicode or through register scan initialization.

We have also provided a second mechanism. The second mechanism is used to assist millicode emulation by trapping the result of an exceptional condition without invoking the trap handler. When an exceptional condition is detected during execution, the IEEE 754 standard requires two different actions under control of a mask bit. If the mask bit is on, the result is written into an FPR and the trap handler is invoked. Otherwise, a default value is written, a flag is set, and the program continues execution. Our mechanism allows a variation to the IEEE 754 standard. If an exceptional condition occurs, the trapped result will be written to the floating point register array, the data exception code is written to a non-architected data exception code register, and the program advances to the next sequential instruction. This mechanism is also controlled by a control register which can be set by millicode.

Accordingly, the Hardware FPC (Floating Point Control word) 22 is a register that is a hardware version of the architected FPC 24. It contains mask bits which control the actions taken in the event of exceptional conditions. There are five mask bits FPC(8–12) that control the five exceptional conditions: invalid operation, divide by zero, exponent overflow, exponent underflow, and inexact result respectively. There is an additional mask bit, FPC(7), that when active causes an exceptional condition to be trapped without invoking the trap handler. The net result is to write the trapped result in the floating point register array, a Data Exception Code (DXC) is placed in the Hardware FPC 22, and the program pointer advances. It should be noted that the Hardware FPC 22 differs from the Architected FPC 24. The Hardware FPC 22 contains additional bits that control the way additional non-architected exception conditions are handled. The Hardware FPC 22 has bit combinations which are not identified in the architecture. The Hardware FPC 22 is only accessible to the hardware and system millicode. It is not user accessible.

The Architected FPC 24 is the architected Floating Point Control word. It is accessible to the user and is updated under control of the system millicode.

The Exception Handler Unit 20 operates on the exceptional conditions and special events under the control of the mask bits contained in the Hardware FPC 22 and the Disable Mask Register 18. If a special event occurs and the corresponding disable mask register bit is active, then the Exception Handler Unit 20 creates a data exception code (DXC) and the trap handler is invoked. The exception codes for events corresponding to the Disable Mask Register 18 are considered to be pseudo exceptions since they are not architected and do not cause real data exceptions. The trap handler recognizes the pseudo exception code and then transfers control to the millicode emulation routine. The five exceptional conditions are masked with the Hardware FPC 22 register mask bits, FPC(8:12) respectively. When a masked exceptional condition occurs the DXC code in the Hardware FPC 22 is set. If FPC(7) is active then the suppression signal is activated and the Take Interrupt signal is not activated. If Hardware FPC(7) is not active then the suppression signal is not active and the Take Interrupt signal is active.

Now our preferred embodiment has Mult/Sub Enable 30 controls for the operation of the binary Multipy-then-Subtract instruction. When active, the Multiply-then-Subtract instruction performs Op3<=Op3−Op1*Op2. When not active the Multiply-then-Subtract instruction performs Op3<=Op1*Op2−Op3. This allows implementation of our final mechanism. The final mechanism statically alters the hardware execution of the Multiply-then-Subtract instruction under the control of a control register which can only be set during a scan sequence. As the function of the Multiply-then-Subtract instruction can either be Op3<=Op3−Op1*Op2 or Op3<=Op1*Op2−Op3; where Op1 represents operand 1, Op2 represents operand 2, and Op3 represents operand 3, the first form of the function can be and is being implemented in IBM's S/390 vector architecture whereas the second form is implemented in PowerPC Architecture. (IBM, S/390 and PowerPC Architecture are all trademarks of International Business Machines Corporation, Armonk, N.Y.) The IEEE 754 standard does not define the multiply/subtract but it is a simple extension to the standard. Our mechanism allows for an implementation to satisfy both definitions with static reconfiguration.

An example the use of the first mechanism is for the case of handling three operand instructions which have a NaN (Not-A-Number) input. Hardware implementation of the Multiply-then-Add instruction assumed that if more than one input operand was a NaN then the data output is equal to one of the input operands with priority given to whichever is a signalling NaN and then to operand 1, and then to operand 2. If the architecture changed after hardware was fabricated it is easy to over-ride hardware by setting the most significant bit of disable mask register 18. When the Final detector of special condition 14 detects a NaN input and the three operand instruction Multiply-Then-Add, it signals to the Exception handler unit 20 that this specific event has occurred. The exception handler unit 20 then examines the disable mask bit register 18 bit 0 which has been set to a value of one either by system millicode or by initial program load. If this bit had a value of zero normal execution would take place in hardware, but this bit is equal to one so a suppression signal is sent to the Suppression Unit 16, a data exception code of hex 83 is written into the hardware fpc 22, and a take interrupt signal is sent to the instruction unit to branch to the exception handler routine. This routine examines the data exception code and determines that this unique DXC code indicates that a millicode routine should be branched to which emulates the Multiply-then-Add instruction with a series of simple instructions. At the end of the routine control is passed back to the original instruction stream containing the Multiply-then-Add instruction. In this manner, hardware performance is maintained for the common input cases but for the case of NaN input, if the architecture definition changes or there are bugs in hardware, a millicode routine can be invoked.

An example of the second mechanism of this invention is in the implementation of the complex instruction Divide to Integer. This instruction divides two floating point numbers and reports the integer quotient and its remainder. The overall instruction is too complex to implement in hardware so a millicode routine was written which utilizes simpler instructions. Once the quotient is determined the remainder operation is simply a Multiply-then-Subtract instruction. But there is a need to execute the Multiply-then-Subtract instruction in a controlled manner so that it does not cause a trap out of the routine. Even though the remainder could underflow the overall operation of Divide to Integer may not be defined to trap when the remainder underflows. Mechanism two provides a means for executing any floating point instruction and producing a trapped result without taking a trap but noting in the hardware fpc 22 that one was not taken. Millicode on entering the routine sets the hardware fpc 22 mask bit 7 to a one to not invoke any traps. If a Multiply-then-Subtract operation were executed which had an underflow condition this would be detected by the final detector of special condition 14 and signalled to the exception handler 20. Then the hardware fpc 22 mask bit 7 would be examined to determine the required action. If this bit were a zero, then the take interrupt signal would be active to invoke the exception handler and the data exception code corresponding to underflow (hex 10) would be written to the hardware fpc 22, and during the exception handler the DXC would be written to the architected FPC 24. But instead, since the mask bit 7 is a one the DXC is still written to the hardware FPC 22 but never to the architected FPC 24 and the take interrupt signal is inactive. This allows the next instruction in the millicode routine to be executed rather than the exception handler routine.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A floating point unit (FPU) for a computer system, comprising a FPU dataflow pipeline having multiple pipeline stages for arithmetic computation, a normalization stage, and a rounding stage, each of which pipeline stages occurs during processing of a stream of instructions in said dataflow pipeline, said FPU dataflow pipeline having data inputs and control inputs for receiving data and control input data and instructions for performing a floating point computation, said FPU dataflow pipeline also having data outputs wherein resultant data are outputted from the FPU dataflow pipeline and a control output used to update architectural information including floating point array write enables and addresses, condition codes, and a completion signal which will advance a program pointer for said floating point unit, a detector of special conditions unit for dynamically detecting an event occurring during execution of an instruction in the floating point unit that hardware execution of an IEEE compliant binary floating point instruction will require millicode emulation, said detector of special conditions unit being controlled by system registers which are set by millicode or set at initial program load, and when one of the events occurring during execution of the instruction in the floating point unit that hardware execution of an IEEE compliant binary floating point instruction will require millicode emulation is detected, a corresponding system register mask is checked by an exception handling unit to determine if a floating point computation should be completed or suppressed.

2. A floating point unit (FPU) according to claim 1 wherein when the floating point computation should be suppressed, then a floating point suppression unit suppresses all updates to any architected facilities and produces a pseudo-exception code while gating the control output used to update architectural information of the FPU dataflow pipeline under control of a suppression signal supplied by said except handler unit.

3. A floating point unit (FPU) according to claim 2 said pseudo-exception code is then passed to a floating point trap handler which interprets the pseudo-exception code and then invokes a millicode routine which emulates the instruction using discrete instructions.

4. A floating point unit (FPU) according to claim 3 when the suppression signal is active, the FPU dataflow pipeline is unable to update any architected facilities.

5. A floating point unit (FPU) according to claim 3 wherein the floating point unit uses a floating point architecture which has unstable areas which are identified by the architecture, and said detecting of special conditions by said detector of special conditions unit includes detecting exceptional conditions as identified by the architecture including as invalid operation, divide by zero, exponent overflow, exponent underflow, and inexact result, said detector of special conditions unit also detects other special events including a first special event when any three operand instruction is executed which has one or more NaN operands, a second special event when a binary extended multiply, divide, or square root instruction with a denormalized input operand is executed, and a third special event when any binary floating point instruction is executed that results in exponent overflow, a fourth special event when any binary floating point instruction is executed that results in exponent underflow.

6. A floating point unit (FPU) according to claim 5 wherein said special events were predetermined during floating point architecture development to be complex to implement in hardware, prone to error, or to be an area in the architecture which is unstable and the occurrence of a special event is communicated to the exception handler unit.

7. A floating point unit (FPU) according to claim 5 having a disable mask register containing disable bits that will control actions that occur when special events are detected by the detector of special conditions unit, said disable mask register containing four bits that correspond one for one to a predefined special event, said disable mask register being updated through system millicode or through register scan initialization.

8. A floating point unit (FPU) according to claim 5 wherein a floating point control word is determined by a register which is a hardware version of an architected floating point control word, said hardware floating point control word register containing control mask bits which control actions taken when one of the exceptional conditions is detected.

9. A floating point unit (FPU) according to claim 8 wherein there are five control mask bits that control five exceptional conditions: invalid operation, divide by zero, exponent overflow, exponent underflow, and inexact result respectively.

10. A floating point unit (FPU) according to claim 9 wherein there is an additional control mask bit that causes an exceptional condition to be trapped without invoking a floating point trap handler.

11. A floating point unit (FPU) according to claim 10 wherein in order to write a trapped result in a floating point register array, a data exception code (DXC) is placed in said hardware floating point control word register and the floating point program pointer advances.

12. A floating point unit (FPU) according to claim 8 said hardware floating point control word register differs from an architected floating point control word in that said hardware floating point control word register contains additional bits that control the way additional non-architected exception conditions are handled and has bit combinations which are not identified in the floating point architecture, said hardware floating point control word register being only accessible to the hardware and system millicode and not user accessible.

13. A floating point unit (FPU) according to claim 12 wherein said architected floating point control word is architected and accessible to a user and is updated under control of the system millicode.

14. A floating point unit (FPU) according to claim 7 wherein said exception handler unit operates on the exceptional conditions and special events under the control of the disable bits contained in said hardware floating point control word register and said disable mask register, and wherein if a special event occurs and the corresponding disable mask register bit is active, then said exception handler unit creates a data exception code (DXC) and said trap handler is invoked.

15. A floating point unit (FPU) according to claim 14 wherein said data exception codes for events corresponding to the disable mask register are considered to be pseudo exceptions and not architected and they do not cause real data exceptions.

16. A floating point unit (FPU) according to claim 15 wherein when the system trap handler recognizes the pseudo exception code it then transfers control to a millicode emulation routine.

17. A floating point unit (FPU) according to claim 14 wherein exceptions conditions are masked with said hardware floating point control word register's register mask bits and when a masked exceptional condition occurs the DXC code in said hardware floating point control word register is set, and if a specific suppress mask bit is active then a suppression signal is activated and a Take Interrupt signal is not activated, but when said specific suppress bit is not active then the suppression signal is not active and the Take Interrupt signal is active.

18. A floating point unit (FPU) according to claim 5 wherein a multiply/subtract enable control register is provided which is coupled to input scanned data to said floating point unit dataflow pipeline for execution of a Multiply-then-Subtract instruction, and when active, the Multiply-then-Subtract instruction executes Op3<=Op3–Op1*Op2, but when not active the Multiply-then-Subtract instruction executes Op3<=Op1*Op2–Op3.

19. A floating point unit (FPU) according to claim 18 wherein said Multiply-then-Subtract instruction's execution is statically altered under the control of said multiply/subtract enable control register which only is set during a scan sequence.

20. A floating point unit (FPU) according to claim 19 wherein said Multiply-then-Subtract instruction executes Op3<=Op3–Op1*Op2 or Op3<=Op1*Op2–Op3; where Op1 represents operand 1, Op2 represents operand 2, and Op3 represents operand 3; either of which executes in a specific hardware unit's microprocessor.

* * * * *